United States Patent Office

3,440,712
Patented Apr. 29, 1969

3,440,712
BRAZING ALUMINUM
Philip T. Stroup, New Kensington, Charles Norman Cochran, Oakmont, and John J. Stokes, Jr., Murrysville, Pa., assignors to Aluminum Company of America, Pittsburgh, Pa., a corporation of Pennsylvania
No Drawing. Filed Oct. 27, 1966, Ser. No. 589,837
Int. Cl. B23k *31/02*
U.S. Cl. 29—494      6 Claims This invention relates to brazing aluminum members, particularly to a method of brazing such members without the use of a metal halide salt flux. By aluminum members is meant useful shapes, parts or components made of aluminum or its alloys.

As is generally recognized, aluminum members being brazed, referred to as the parent members, may be joined by an aluminum brazing filler alloy, usually an aluminum-silicon alloy, having a melting point slightly below that of the parent members. Brazing is effected by heating the parent members and the filler alloy to a temperature above the melting point of the latter but short of melting point of the former. The molten filler alloy flows and forms a joining fillet connecting the parent metal members. Some diffusion between parent member and filler alloy occurs and the joint is considered, at least to some degree, to be metallurgically bonded.

Normally an alkali metal halide salt flux, hereinafter referred to as a salt flux, is employed to overcome the oxide coating on the parent metal surfaces and allow the filler metal to wet and flow over these surfaces. This is considered necessary to obtain the capillary flow and uninterrupted fillet formation desired. The amount of salt flux employed is substantial and post-brazing removal of flux residues resulting from such practices is desirable but often difficult. This is especially so in the case of an intricate or complex assembly which tends to retain undesired, corrosive flux residues.

Vacuum brazing without any salt flux has been proposed as one way of alleviating flux residue removal problems. However, such processes are marked by certain disadvantages principally attributed to the tenacious oxide film adhering to the metal surface. Even after careful cleaning some of the film is restored before brazing can take place. In most cases this film is not broken or disturbed sufficiently and the bare metallic surface of the parent members cannot be wetted sufficiently by the filler alloy to consistently form joints of good quality.

Accordingly, it is an object of the invention to provide for brazing aluminum or aluminum alloy members without the use of a salt flux.

In accordance with the invention, it has been found that employing certain metal additives, together with providing a special gas flux, facilitates brazing aluminum members without leaving any significant flux residue. As described in more detail hereinafter, the metal additives may be incorporated in the brazing filler alloy or the parent members, or both, and the gaseous flux is introduced prior to reaching brazing conditions, that is, filler metal fusion. The joints formed in accordance with the invention are of the same high quality normally associated in the art with furnace brazing using a conventional salt flux.

The metal additives contemplated by the invention are small, but highly effective, amounts of scandium, yttrium and the lanthanide series from Period 6 of the Periodic Table consisting of lanthanum, cerium, praseodymium, neodymium, promethium, samarium, europium, gadolinium, terbium, dysprosium, holmium, erbium, thulium, ytterbium and lutetium. These additives are provided in amounts of 0.0001 to 1%, and preferably within 0.001 to 0.1%, by weight. Within these ranges it has been found that the presence of the additives permits ready penetration of the oxide film by gaseous fluxes. The invention also contemplates the use of a gaseous flux, introduced before brazing in an otherwise substantially vacuum or inert atmosphere. The gases which have been found suitable are phosphorus pentachloride, phosphorus pentabromide together with the trivalent chlorides, bromides and iodides of phosphorus and boron. These gases, especially boron trichloride, serve to accelerate the disruption of the oxide film. The effects of the metal additive and gaseous flux combine in enabling the brazing alloy to quickly penetrate the film and effectively wet the bare metal surfaces of the parent members being joined. If the additives are present in less than the designated amounts, the advantages of the invention are not fully realized. Exceeding the specified ranges offers little, if any, advantage and could introduce undesirable variations in the physical properties of the brazed assembly. Noteworthy is the fact that the metal additives, in the amount specified, can be incorporated into most aluminum alloys without disturbing their basic characteristics such as strength, corrosion resistance, etc. The same holds for the brazing filler alloys in that the melting point and other important properties of a given filler alloy are not altered noticeably, which permits brazing at normal temperature levels. While it is generally more convenient to incorporate the additives in the filler alloy alone, such is not necessarily required in the practice of the invenion which, as indicaed earlier, contemplates their incorporation into filler alloy or parent members, or both. Because the amount of the additives employed is rather small, the particular form or purity in which they are provided is not critical. For instance, the common misch metal variety of cerium, or the like, can be used to introduce the desired amount of additive metal. The small amounts of iron or other impurities inadvertently introduced in this way are generally inconsequential although special cases may dictate otherwise, as those skilled in the art will appreciate.

The aluminum parent members may be composed of aluminum or any aluminum alloy adapted to brazing. The aluminum brazing filler alloy can be defined as an aluminum base alloy which melts at a lower temperature than any of the parent members being joined. As is known, most brazing filler alloys for use with aluminum contain at least 75%, by weight, aluminum alloyed with from about 4 to 13% silicon, although copper, in amounts of about 3 to 5%, or zinc, in amounts of about 9 to 11%, or both, may also be included. As is also known, brazing filler alloys are available in a number of forms such as wire, shims, wire rings and brazing sheet. Examples of suitable brazing sheet products comprising an aluminum alloy core and an integral layer of aluminum brazing alloy are provided by the disclosure of U.S. Patent 2,312,039. By way of illustration, brazing sheet laminates commercially available include aluminum filler metal cladding containing 7.5 to 10% silicon, and a core layer of aluminum alloy 3003 (Al, 1.2% Mn) or alloy 6951 (Al, 0.25% Cu, 0.35% Si, 0.65% Mg). The cladding normally constitutes 5 or 10% of the total thickness. Where brazing sheet is employed, the need for a separate filler alloy material is generally obviated.

Before brazing, the parent members should be cleaned as is customary in the art. Any oil or grease, of course, should be removed. It is preferable, but not absolutely necessary, that the oxide coating in the vicinity of the joint be removed, for example by chemical or mechanical cleaning, particularly where the members were previously heat treated since their oxide coating is especially tenacious because of the furnace exposure. Brushes or chemical etchants are known to serve this purpose. The members preferably are brazed within 48 hours after cleaning as this tends to minimize any new oxide film accumulation.

After cleaning, the parent members, together with the brazing filler alloy, are placed together in joining relationship in the configuration intended to be fixed by the brazing operation. They may be held by clamps, jigs or other means known in the art. By joining relationship is meant that the members and filler alloy are positioned in such proximity that the latter can flow at the joint site and form a connecting fillet as is readily understood by those practicing the art.

The assembly is heated in a vacuum of $2\times10^{-5}$ torr or lower, meaning an absolute pressure of this level or a lower absolute pressure such as $1\times10^{-6}$ torr. This results in a release or outgassing of various gases from the assembly, which as is known, requires significant combined vacuum and temperature effects. A minimum level is 550° F. and $1\times10^{-4}$ vacuum. Far better outgassing results from increasing the temperature to at least 750° F. or reaching a vacuum of $2\times10^{-5}$ or less, or both. Once outgassing has occurred, the temperature is increased to brazing temperature whereupon the filler alloy fuses and flows to form the connecting fillet across the joint. Brazing temperatures are those normally associated with furnace brazing, namely, about 1000° to about 1200° F. As is known, brazing temperature is considered to be any temperature which melts the filler metal but not the parent members, and the term as used herein is intended in that sense. The gas flux is generally introduced at any point after outgassing has occurred although introduction at a minimum temperature of 1000° F. is the better practice. The best results are achieved if the gas is introduced when the temperature reaches the range of 1150 to 1175° F. In other words, it is preferable to introduce the gas as the temperature reaches the brazing level. To conserve the quantity of gas flux employed, the pumping action of the furnace vacuum pump may be halted at some time subsequent to outgassing but prior to the introduction of the gas. Brazing conditions as just described are maintained for a sufficient time to allow the filler metal to wet, and form a joining fillet connecting the parent members at the joining site. One to five minutes generally is sufficient. The assembly is then cooled to solidify the filler metal.

As indicated earlier, gases which have been found suitable as fluxes in practicing the invention are phosphorus pentachloride, phosphorus pentabromide together with the tri-valent chlorides, bromides and iodides of phosphorus and boron. A preferred embodiment of the invention contemplates the use of boron trichloride which produces very good fluxing action. An added advantage realized with $BCl_3$ is that it is gaseous at relatively low temperatures which makes its use attractive from a practical standpoint. The partial pressure of boron trichloride found to provide very good results varies from 0.1 to 40 torr, preferably 1 to 15 torr. It is not absolutely necessary that the atmosphere consist solely of the boron trichloride or other gas flux in accordance with the invention, and in some instances it will be more convenient to provide the gas in the form of a mixture with an inert gas. By an inert gas here is meant a gas which does not defeat the fluxing action of the gaseous flux. Suitable gases are the so-called noble gases together with nitrogen and hydrogen. The inert gas should be of high purity to avoid contaminating the brazing atmosphere. In combining boron trichloride with an inert gas the partial pressure of boron trichloride, again, most preferably falls within the range of 1 to 15 torr. For instance, a highly useful mixture consists of 2% boron trichloride in argon with a total pressure of 400 torr. This corresponds to a boron trichloride partial pressure of 8 torr.

Illustrative of the practice of the invention, inverted T joints of the type commonly used in the aluminum brazing art to evaluated brazing procedures were made. The brazed structure comprised a horizontal or base member joined to the vertical member by a butt joint with a fillet on both sides of the junction. The vertical member, about ¾-inch wide, 2 inches long, $\frac{1}{16}$-inch thick, consisted of aluminum alloy 3003. The horizontal or base member, of the same size, was fashioned from brazing sheet consisting of 3003 aluminum alloy clad with a brazing alloy containing 7.5% silicon, 0.01% misch metal (70% cerium, balance mainly iron) the remainder being aluminum. The cladding constituted 10% of the total thickness of the horizontal member. The members were assembled in joining relationship with the edge of the vertical member butting against the brazing filler cladding on the horizontal member to provide a junction 2 inches long. The assemblies were cleaned by immersion in toluene or acetone and then dried. No etching or mechanical oxide removal was employed in preparing these assemblies for brazing. Each assembly was placed inside a small glass furnace provided with an external electrical heating means. The furnace was evacuated to an absolute pressure of $2\times10^{-5}$ torr. As the furnace was being evacuated, the assembly was heated slowly, to 932° F., and more rapidly to 1175° F., at which point the evacuation was discontinued and the furnace then isolated from the vacuum pumping system. In a container connected to the furnace, phosphorus pentabromide, $PBr_5$, crystals were heated to about 250° F. to produce a quantity of $PBr_5$ vapor which was admitted to the brazing site in the furnace after isolation from the vacuum pump. After three minutes under these conditions, the assemblies were cooled so that the filler metal could solidify. The thus brazed joints exhibited large, continuous and smooth fillets characteristic of good brazed joints.

As a further illustrative example of the practice of the invention, inverted T type specimens of the type described above were brazed in much the same fashion as just described. However, in this instance boron trichloride ($BCl_3$) gas was admitted to the system, which had been evacuated to a pressure of about $2\times10^{-5}$ torr at a temperature of about 1175° F. The $BCl_3$ gas was admitted until a pressure of 20 torr was obtained. After three minutes under these conditions good brazed joints were achieved. In another case, where the $BCl_3$ pressure was maintained at only 1 torr, good joints were achieved after only one minute.

As a still further illustrative example of the practice of the invention, inverted T joints were brazed in the presence of $BCl_3$ gas as described in the immediately preceding paragraph, excepting that in this instance the boron trichloride was introduced in the form of a mixture of argon and 2% $BCl_3$. In some instances the gaseous mixture was admitted to establish a pressure of 50 torr, and in order instances 250 torr. In either case, good brazed joints were achieved after four minutes exposure at 1175° F.

What is claimed is:

1. The method of brazing aluminum members comprising:
    (1) bringing into joining relationship the joint constituents to provide an assembly which comprises said members together with an aluminum base brazing filler alloy disposed at the joining site, at least one of said joint constituents containing 0.0001 to 1%, by weight, of at least one metal additive selected from the group consisting of scandium, yttrium and the lanthanide metals from Period 6 of the Periodic Table, the combined total of said additives not exceeding 1%,
    (2) heating said assembly in a vacuum to effect outgassing therefrom,
    (3) subjecting said assembly to brazing temperature in the presence of at least one gaseous flux selected from the group consisting of the pentachloride and pentabromide of phosphorus and the trivalent chlorides, bromides and iodides of phosphorus and boron,
    (4) maintaining said brazing temperature and said gaseous flux at said joining site for a sufficient time to allow said filler metal to wet, and form a joining fillet connecting, said members at said joining site, (5) solidifying said filler metal.

2. The method according to claim 1 wherein the members are heated to at least 750° F. at a vacuum level of at least $2 \times 10^{-5}$ torr to effect outgassing.

3. The method according to claim 2 wherein the gaseous flux is boron trichloride.

4. The method according to claim 2 wherein the brazing filler alloy montains from 0.001 to 0.1% of the metal additives.

5. The method of brazing aluminum members comprising:
(1) bringing into joining relationship to provide an assembly, said members together with an aluminum base brazing filler alloy containing 0.001 to 0.1%, by weight, of at least one metal additive selected from the group consisting of scandium, yttrium and the lanthanide metals from Period 6 of the Periodic Table, the combined total of said additives not exceeding 1%,
(2) heating said assembly to a temperature of at least 750° F. in a vacuum of at least $2 \times 10^{-5}$ torr to effect outgassing from said members and said brazing filler alloy,
(3) further heating said assembly to a temperature of at least 1000° F.,
(4) introducing to the brazing site so as to contact the surfaces of said parent members and said brazing filler alloy at the brazing site a gas comprising boron trichloride, the boron trichloride exerting a partial pressure 0.1 to 40 torr,
(5) subjecting said assembly to brazing temperature in the presence of said gas for a sufficient time to allow said brazing filler alloy to wet the surfaces of, and form a fillet connecting, said parent members,
(6) solidifying said brazing filler alloy.

6. The method of brazing aluminum members comprising:
(1) bringing into joining relationship, to provide an assembly, said members together with an aluminum base brazing filler alloy containing 0.001 to 0.1%, by weight, of at least one metal additive selected from the group consisting of scandium, yttrium and the lanthanide metals from Period 6 of the Periodic Table, the combined total of said additives not exceeding 1%,
(2) heating said assembly to a temperature of at least 750° F. in a vacuum of at least $2 \times 10^{-5}$ torr to effect outgassing therefrom,
(3) further heating said assembly to a brazing temperature of 1150 to 1175° F. and thereupon introducing to the brazing joint site a gas whose sole reactive constituent is boron trichloride, the boron trichloride exerting a partial pressure of 1 to 15 torr,
(4) maintaining said brazing temperature and said gas at said brazing site for a sufficient time to allow the brazing filler alloy to wet the surfaces of, and form a fillet connecting, said members,
(5) solidifying said brazing filler alloy.

References Cited

UNITED STATES PATENTS

| | | | |
|---|---|---|---|
| 2,674,790 | 4/1954 | Edson | 29—495 X |
| 2,674,791 | 4/1954 | Edson | 29—494 |
| 2,747,066 | 5/1956 | Brace. | |
| 3,055,096 | 9/1962 | Bertossa | 29—471.5 |
| 3,133,348 | 5/1964 | Cape | 29—494 |
| 3,356,494 | 12/1967 | Bredzs | 75—141 |
| 3,370,343 | 2/1968 | Martin | 29—494 |
| 3,373,482 | 3/1968 | Miller | 29—501 |
| 3,373,483 | 3/1968 | Miller | 29—501 |
| 3,375,570 | 4/1968 | Dubusker | 29—472.3 |
| 3,378,914 | 4/1968 | Miller | 29—494 |

JOHN F. CAMPBELL, *Primary Examiner.*

R. F. DROPKIN, *Assistant Examiner.*

U.S. Cl. X.R.

29—197.5, 495, 498, 500, 504